(12) United States Patent  
Ho et al.

(10) Patent No.: US 7,639,819 B2
(45) Date of Patent: Dec. 29, 2009

(54) METHOD AND APPARATUS FOR USING AN EXTERNAL SECURITY DEVICE TO SECURE DATA IN A DATABASE

(75) Inventors: Min-Hank Ho, Newark, CA (US); Paul Youn, Redwood City, CA (US); Daniel ManHung Wong, Sacramento, CA (US); Chon Lei, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 961 days.

(21) Appl. No.: 11/156,307

(22) Filed: Jun. 16, 2005

(65) Prior Publication Data

US 2006/0288232 A1    Dec. 21, 2006

(51) Int. Cl.
*H04L 9/00*    (2006.01)
(52) U.S. Cl. .................. 380/277; 713/192; 713/193
(58) Field of Classification Search .............. None
See application file for complete search history.

(56) References Cited

U.S. PATENT DOCUMENTS

| | | | | |
|---|---|---|---|---|
| 5,144,665 | A * | 9/1992 | Takaragi et al. ............. 380/30 |
| 6,336,900 | B1 * | 1/2002 | Alleckson et al. ........... 600/485 |
| 7,028,191 | B2 * | 4/2006 | Michener et al. ............ 713/182 |
| 7,093,137 | B1 * | 8/2006 | Sato et al. .................... 713/193 |
| 2002/0110244 | A1 * | 8/2002 | Flanagan et al. ............ 380/277 |
| 2003/0084306 | A1 * | 5/2003 | Abburi et al. ............... 713/188 |
| 2004/0255133 | A1 * | 12/2004 | Lei et al. ..................... 713/193 |
| 2006/0053112 | A1 * | 3/2006 | Chitkara et al. ............... 707/9 |

OTHER PUBLICATIONS

"Encryption of Data at Rest", Application Security Inc.'s White Paper, Sep. 2004.*

* cited by examiner

*Primary Examiner*—Michael J Simitoski
*Assistant Examiner*—Peter Poltorak
(74) *Attorney, Agent, or Firm*—Park, Vaughan & Fleming LLP

(57) ABSTRACT

One embodiment of the present invention provides a system that facilitates using an external security device to secure data in a database without having to modify database applications. The system operates by receiving a request at the database to perform an encryption/decryption operation, wherein the encryption/decryption operation is performed with the assistance of the external security module in a manner that is transparent to database applications. In response to the request, the system passes a wrapped (encrypted) column key (a key used to encrypt data within the database) to an external security module, wherein the wrapped column key is a column key encrypted with a master key that exists only within the external security module. The system then unwraps (decrypts) the wrapped column key in the external security module to retrieve the column key. Next, the system returns the column key to the database. The system then performs an encryption/decryption operation on data in the database using the column key. Finally, the system erases the column key from memory in the database.

30 Claims, 4 Drawing Sheets

METHOD AND APPARATUS FOR USING AN EXTERNAL SECURITY DEVICE TO SECURE DATA IN A DATABASE

BACKGROUND

1. Field of the Invention

The present invention relates to databases. More specifically, the present invention relates to a method and an apparatus for using an external security device to secure data in a database without having to modify database applications.

2. Related Art

Banks, government agencies, and other security-conscious Relational Database Management System (RDBMS) users are often required to protect sensitive information. To this end, many of these companies are starting to utilize certified, tamper-resistant external security modules (ESMs) to protect their data.

However, due to the large amount of data that needs to be stored and processed in today's information systems, it is desirable for this level of security to be made available through the RDBMS without compromising the full performance and scalability capabilities of the RDBMS. Furthermore, using an ESM to protect data in an RDBMS should ideally not require changes to existing applications, even if an application accesses data protected by the ESM.

External Security Modules are physical or logical devices, created to be highly resistant to unauthorized access if used properly. A physical ESM is referred to as a Hardware Security Module or HSM. In an HSM, all sensitive data is stored in a separate physical storage device with its own access control policies. The physical storage device along with its software interfaces are usually certified or tested against both physical and software-based intrusion attempts.

A logical ESM is referred to as a Software Security Module or SSM. Sensitive data is usually encrypted in an SSM, and all cryptographic processing is typically done in a protected memory space on the machine that hosts the SSM.

While existing systems that use ESMs provide an unparalleled level of security for RDBMS users, they require developers of applications using the RDBMS to be aware of the type of ESM being used. Furthermore, these developers must produce code within the applications to properly utilize the features of the ESM. Because of this, different types of ESMs can require different programming methods, and the extra customized programming overhead required before one can use an ESM can be costly.

Hence, what is needed is a method and an apparatus for utilizing the security features of external security modules with relational database management systems without the problems discussed above.

SUMMARY

One embodiment of the present invention provides a system that facilitates using an external security device to secure data in a database without having to modify database applications. The system operates by receiving a request at the database to perform an encryption/decryption operation, wherein the encryption/decryption operation is performed with the assistance of the external security module in a manner that is transparent to database applications. In response to the request, the system passes a wrapped (encrypted) column key (a key used to encrypt data within the database) to an external security module, wherein the wrapped column key is a column key encrypted with a master key that exists only within the external security module. The system then unwraps (decrypts) the wrapped column key in the external security module to retrieve the column key. Next, the system returns the column key to the database. The system then performs an encryption/decryption operation on data in the database using the column key. Finally, the system erases the column key from memory in the database.

In a variation on this embodiment, the system generates the master key by sending a request to the external security module to create a random key with a data key type to be used as the master key. The system then flags the master key as non-exportable. Finally, the system receives a handle from the external security module at the database that facilitates referencing the master key during subsequent database transactions.

In a variation on this embodiment, the system generates the wrapped column key by generating a random number in the external security module for use as the column key. The system then encrypts the column key with the master key in the external security module. Next, the system flags the wrapped column key as exportable and passes the wrapped column key to the database. Finally, the system stores the wrapped column key in a column key metadata table.

In a variation on this embodiment, the system generates the wrapped column key by generating a random number in the database for use as the column key. The system then passes the column key to the external security module. Next, the system wraps the column key with the master key in the external security module and flags the wrapped column key as exportable. The system then passes the wrapped column key to the database, and stores the wrapped column key in a column key metadata table.

In a variation on this embodiment, the external security module can be a hardware security module or a software security module.

In a variation on this embodiment, the system stores data in the external security module.

In a variation on this embodiment, the external security module is authenticated to the database via a direct attachment to the database, a username and a password, or a strong authentication method, including a security token or a smart card.

In a variation on this embodiment, the encryption can be either symmetric encryption or asymmetric encryption.

One embodiment of the present invention provides a system that facilitates using an external security device to secure data in a database without having to modify database applications. The system operates by receiving a request at the database to perform an encryption/decryption operation, wherein the encryption/decryption operation is performed with the assistance of the external security module in a manner that is transparent to database applications. In response to the request, the system passes a wrapped column key and data to an external security module, wherein the wrapped column key is a column key wrapped with a master key that exists only within the external security module. The system then decrypts the wrapped column key within the external security module to retrieve the column key. Next, the system performs an encryption/decryption operation on the data within the external security module using the column key. Finally, the system returns the encrypted/decrypted data to the database.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database with an External Security Module

Figure 1:
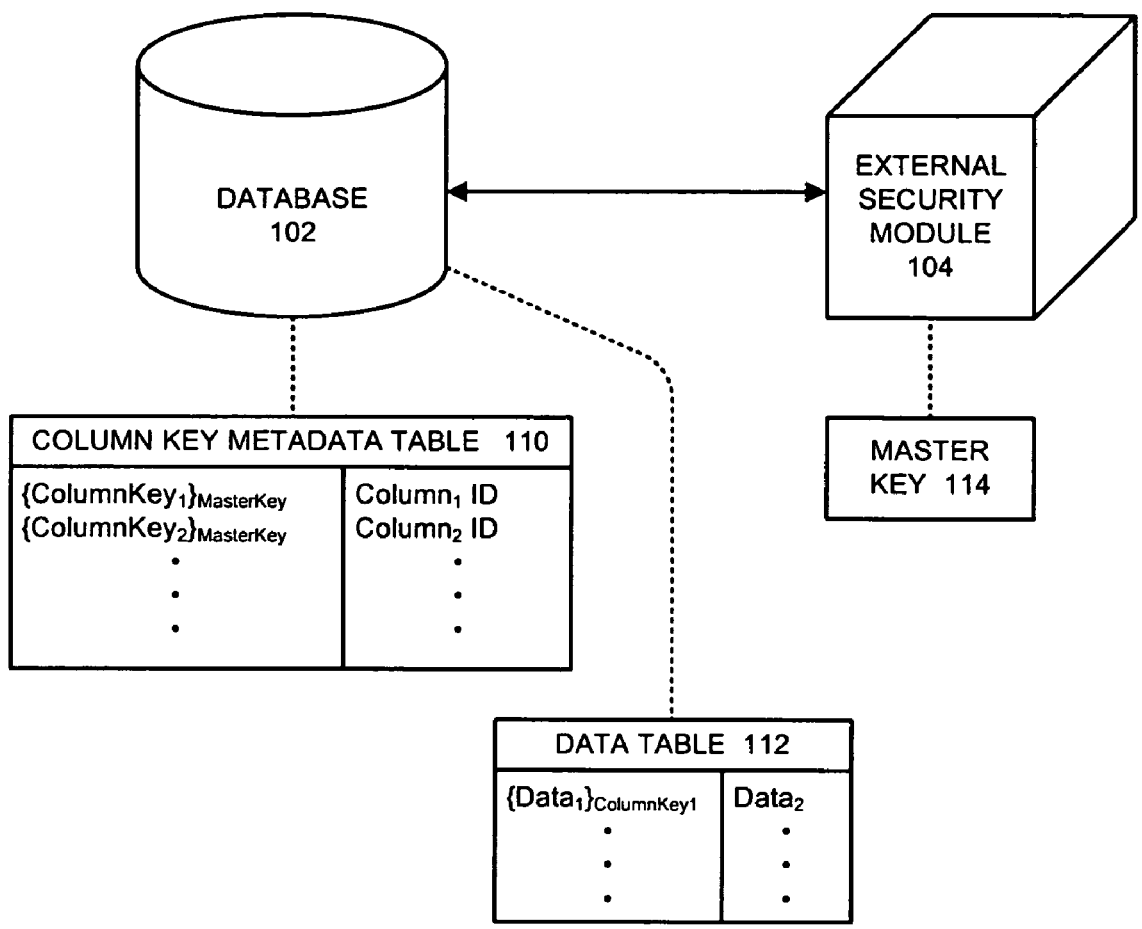
FIG. 1 illustrates a database with an external security module in accordance with an embodiment of the present invention.

FIG. 1 illustrates a database 102 with an external security module 104 in accordance with an embodiment of the present invention. Database 102 can include any type of system for storing data in non-volatile storage. This includes, but is not limited to, systems based upon magnetic, optical, and magneto-optical storage devices, as well as storage devices based on flash memory and/or battery-backed up memory. Database 102 may also be using Oracle's Transparent Data Encryption (TDE) or any other security management service.

Database 102 includes column key metadata table 110 that includes the wrapped column keys for encrypting and decrypting data in other tables such as data table 112. Note that all, some, or none of the data in data table 112 may be encrypted. Note that in one embodiment of the present invention, it is possible to have a row key metadata table and additionally encrypt data in different rows with different keys.

External security module 104 includes master key 114. Master key 114 is contained by external security module 104 and is not known outside of external security module 104.

Note that the system may operate in two modes. The first mode is a two-tiered approach where column keys are encrypted as data and passed to the database 102 for storage in the column key metadata 110. Upon encrypting and decrypting data, the encrypted column key is passed to the ESM 104 and the key is decrypted. A clear-text version of the column key is then sent to database 102 so that database 102 can perform the encryption/decryption operation. Upon completion of the operation, the clear-text version of the column key is destroyed form memory on database 102.

In the second mode, the system handles all encryption/decryption operations inside of ESM 104. In this mode, column keys are not allowed to exist outside of ESM 104 in clear-text. This adds another level of security, but potentially does not exhibit the same performance as the two-tiered approach.

Note that it is also possible to have a hybrid system that uses both of the modes listed above. Data that is deemed more critical can be stored under the ESM only mode, while data that might need to be accessed more readily and is not as much of a security concern might be accessed in the two-phase mode. Also note that it is possible to secure extremely sensitive data in the ESM 104 itself.

Creating a Master Key

Figure 2:
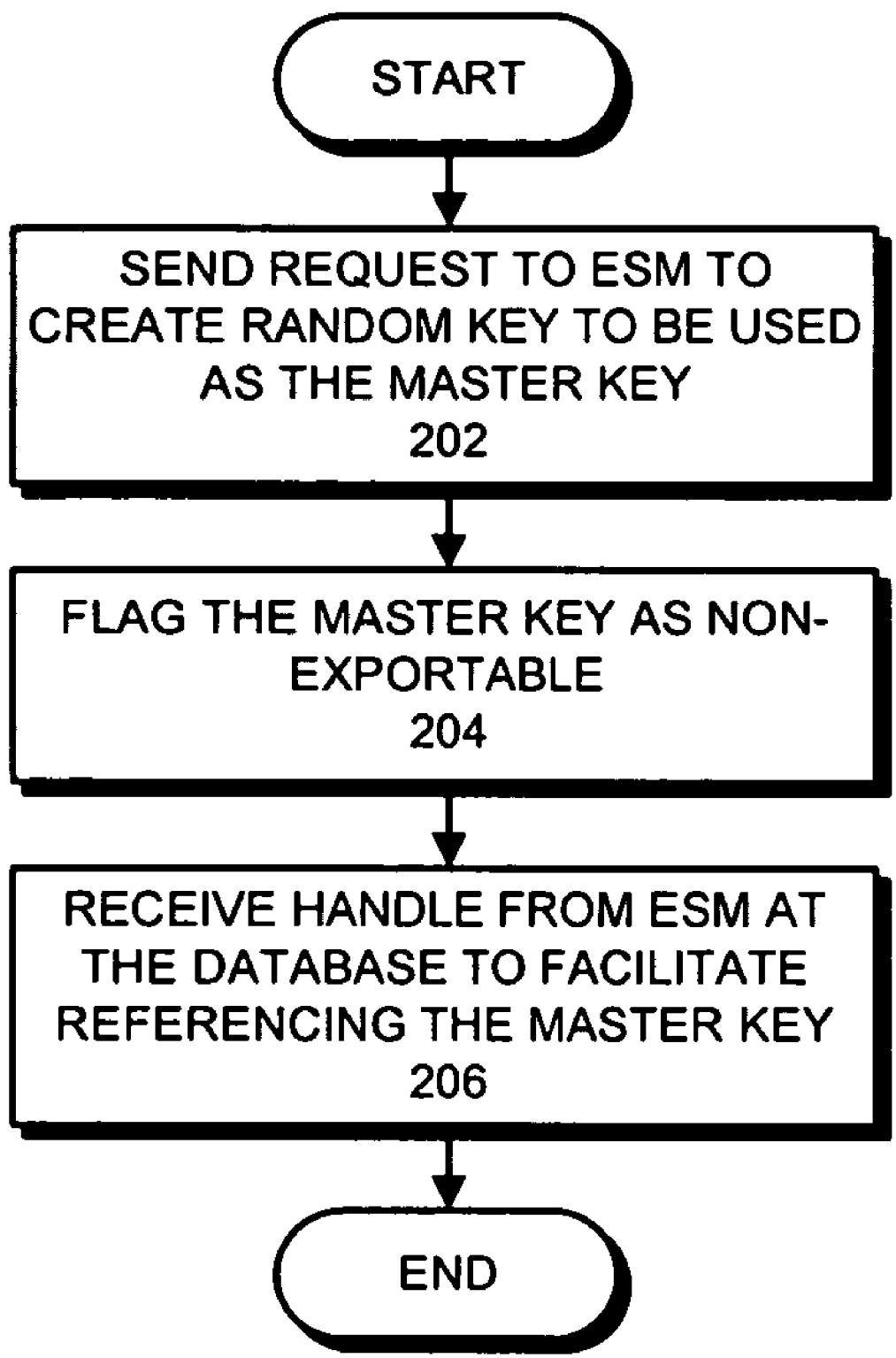
FIG. 2 presents a flowchart illustrating the process of creating a master key in accordance with an embodiment of the present invention.

FIG. 2 presents a flowchart illustrating the process of creating a master key in accordance with an embodiment of the present invention. The system starts by sending a request to the External Security Module (ESM) to create a random key to be used as the master key (step 202). The system then flags the master key as non-exportable (step 204). Finally, the system receives the handle for the master key at the database to facilitate referencing the master key (step 206).

Creating a Column Key in a Two-Tiered Process

Figure 3A:
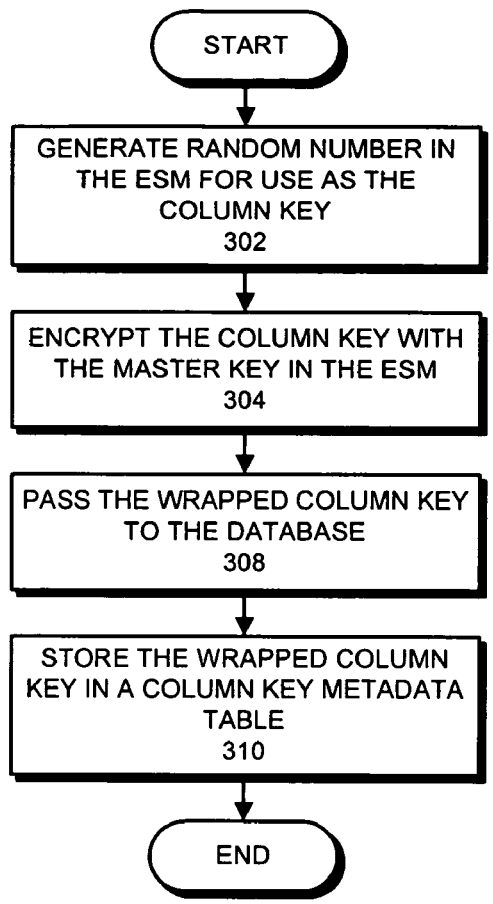
FIG. 3A presents a flowchart illustrating the process of creating a column key in a two-tiered process in accordance with an embodiment of the present invention.

FIG. 3A presents a flowchart illustrating the process of creating a column key in a two-tiered process in accordance with an embodiment of the present invention. The system starts by generating a random number in the ESM for use as a column key (step 302). Next, the system encrypts the column key with the master key 114 inside the ESM 104 (step 304). The wrapped column key is then passed back to database 102 (step 308). Database 102 stores the wrapped column key in column key metadata table 110 (step 310).

Creating a Column Key in an ESM-Only Process

Figure 3B:
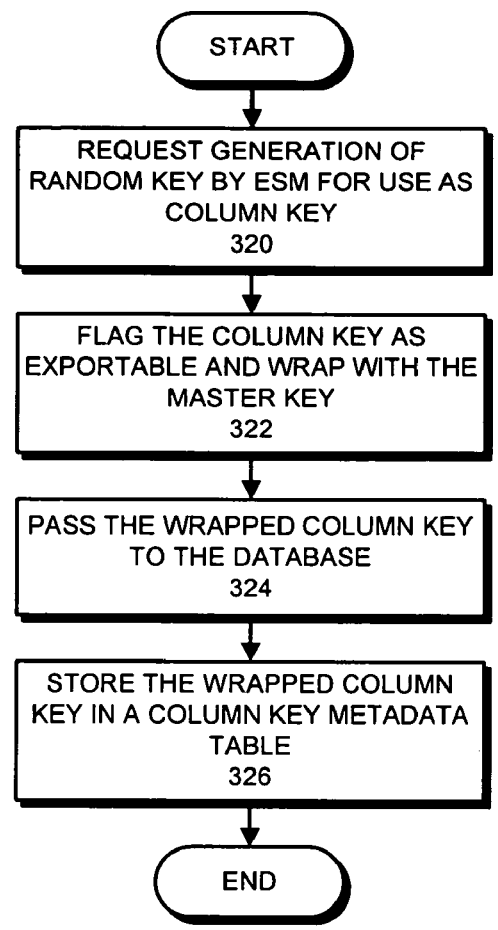
FIG. 3B presents a flowchart illustrating the process of creating a column key in an ESM-only process in accordance with an embodiment of the present invention.

FIG. 3B presents a flowchart illustrating the process of creating a column key in an ESM-only process in accordance with an embodiment of the present invention. The system starts by requesting that a random key be generated for use as a column key within the ESM 104 (step 320). The randomly generated column key is flagged as exportable and sensitive and wrapped by the master key 114, which ensures that it cannot exist outside of ESM 104 in a clear-text form (step 322). The wrapped column key is then passed back to database 102 (step 324). Database 102 stores the wrapped column key in column key metadata table 110 (step 326).

Performing an Encryption/Decryption Operation in a Two-Tiered Process

Figure 4A:
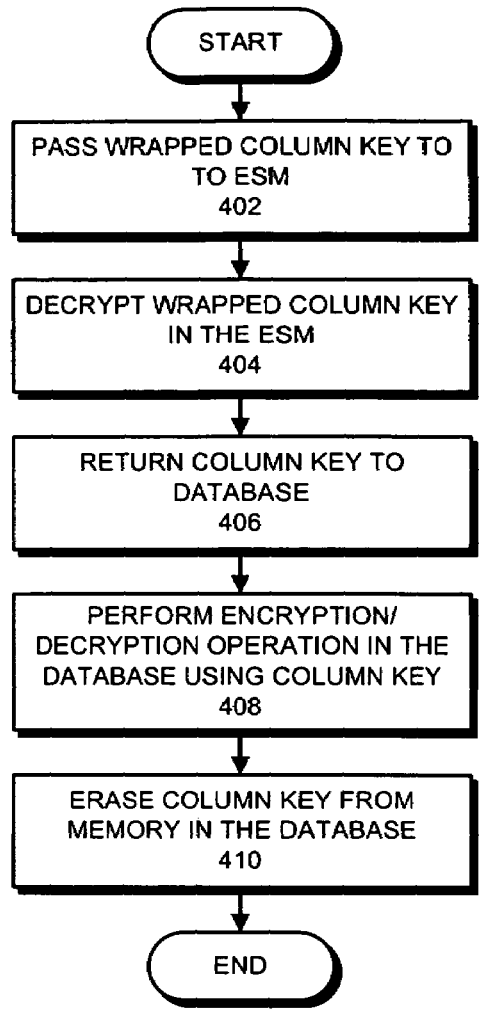
FIG. 4A presents a flowchart illustrating the process of performing an encryption/decryption operation in a two-tiered process in accordance with an embodiment of the present invention.

FIG. 4A presents a flowchart illustrating the process of performing an encryption/decryption operation in a two-tiered process in accordance with an embodiment of the present invention. The system starts by passing a wrapped column key to ESM 104 from database 102 (step 402). Next, ESM 104 decrypts the wrapped column key (step 404) and returns the clear-text version of the column key to database 102 (step 406).

The system then performs an encryption/decryption operation in database 102 using the column key (step 408). Upon completion, to ensure security of the column key, database 102 erases the clear-text version of the column key from memory (step 410).

Performing an Encryption/Decryption Operation Entirely Within an ESM

Figure 4B:
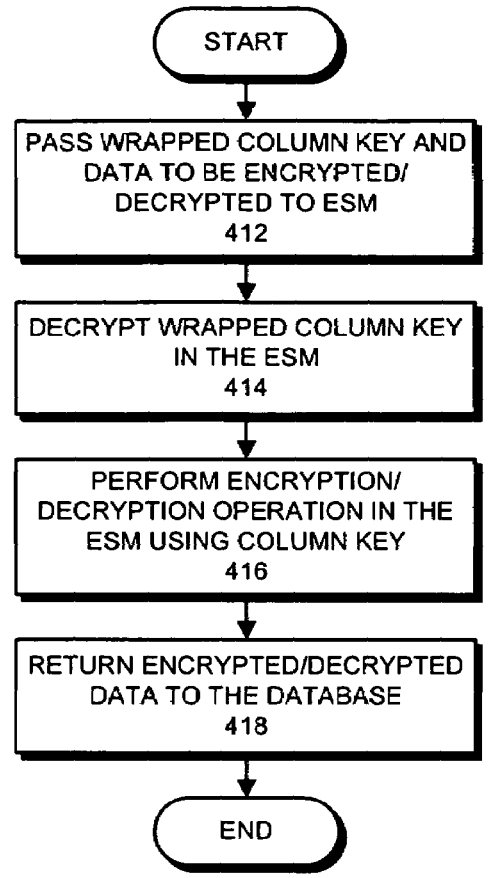
FIG. 4B presents a flowchart illustrating the process of performing an encryption/decryption operation entirely within an external security module in accordance with an embodiment of the present invention.

FIG. 4B presents a flowchart illustrating the process of performing an encryption/decryption operation entirely within an external security module in accordance with an embodiment of the present invention. The system starts by passing a wrapped column key to ESM 104 from database 102, as well as the data to be encrypted or decrypted (step 412). Next, ESM 104 decrypts the wrapped column key (step 414). Once the column key has been decrypted, the system performs the encryption/decryption operation in the ESM 104 using the unwrapped column key (step 416). Finally, the system returns the encrypted/decrypted data to database 102 (step 418).

Exemplary Embodiment

The following is an exemplary embodiment of the present invention. Note that the present invention is not meant to be limited to this exemplary embodiment. Below, a Hardware Security Module is used as an example of an External Security Module, and kernel refers to a specific implementation of a database.

Functionality

From this point forward, master key (or MK) will refer to a key that is stored within the Hardware Security Module (HSM). The HSM is attached to the database, and the phrase "the database's HSM" refers to the HSM used by that database. The key is assumed to only be accessible to the kernel. The master key should never be exposed to anyone, and should only be used for encryption/decryption operations by the kernel.

{data1, data2}_key: refers to the encryption of "data1" and "data2" under the key "key".

From this point forward, assume the phrase "wrapped Column Key" refers to a generic Column Key encrypted (wrapped) under the current Master Key. The term wrapped is generally used when referring to the encryption of key material instead of data.

Note that regardless of the particular Application Programming Interface (API) used to access cryptographic functionality in an HSM, the critical authentication stage is often designed or augmented by specific HSM vendors.

For maximum flexibility, this section is written assuming that the API to interact with the HSM is based on RSA's PKCS #11 standard. This interface is the most commonly implemented standard by HSM vendors, but various HSM vendors also support other APIs such as Microsoft's CAPI (CryptoAPI) which may also be used to provide the below functionality. Note that this is intended as a guideline for a skilled programmer to use to implement the invention. Depending on the specific HSM used, the various function calls may differ. The function calls outlined may also not be the best possible implementation, and may require some minor changes to ensure correctness as is common for all software.

Current PKCS #11 function definitions are taken from the following reference: RSA Security Inc. PKCS #11: Cryptographic Token Interface Standard. An RSA Laboratories Technical Note, Version 2.20, June 2004. Note that any HSM vendor will have to support all of the functions listed below for compatibility and also provide mechanisms for secure authentication.

HSM Interface Setup

Assuming PKCS #11 is used to access the token, there are two types of users: a Security Officer (SO) who is in charge of setting up user accounts, and "Normal Users" who have access to private objects within the token. The Security Officer has account management rights only and cannot access private token objects.

Note that the first person to access the PKCS #11 token must be the Security Officer. When the token is initialized without any secrets, the first contact is trusted to set up a root of trust. When the Security Officer (SO) performs this initial contact is when she sets up both the Security Officer account and the Normal User account.

Initializing Contact with the HSM

Necessary authentication material will still be stored outside of the HSM within a secured wallet (a software secret store). The kernel will use this information to authenticate with the HSM and establish a secure connection. Note that the ability to use the key materials within the HSM depends on this authentication process, but that the Master Key will never be exposed outside of the HSM. The function OpenHSMSession will make the following PKCS #11 calls:

C_GetFunctionList(CK_FUNCTION_LIST_PTR_PTR ppFunctionList)

then:

C_Initialize(CK_VOID_PTR pInitArgs)

is called to initialize a session. To determine which slot the Token is using, we call:

C_GetSlotList(CK_BBOOL tokenPresent, CK_SLOT_ID_PTR slotList, CK_ULONG_PTR slotCount)

Finally, to login to the specified token we call:

C_Login(CK_SESSION_HANDLE hSession, CK_USER_TYPE userType, CK_UTF8CHAR_PTR pPin, CK_ULONG ulPinLen).

Generating a Master Key

The Master Key will be a symmetric AES256 key generated using the HSM's "Key Generate" function. This key will be based on the internal random number generator within the HSM. The Master Key will be flagged as not exportable to insure it can never leave the HSM in the clear.

Under the two-tiered security system model, the Master Key will be generated as a "Data Key". Only Data Keys are allowed to decrypt inputs and return the plaintext outside of the HSM boundary. Wrapper or Export Keys are only allowed to decrypt a key within the HSM for internal use.

Under the HSM-only security model, the Master Key will be generated as a "Wrapper Key". The Master Key will still be used to encrypt Column Keys, but the plaintext column keys will never be seen in the clear outside of the HSM. The purpose of the Master Key is only for backup purposes. Wrapped Column Keys can be freely backed up outside of the HSM.

To generate a key, the system will use GenerateMasterKey which will in turn call the function:

```
C_GenerateKey(CK_SESSION_HANDLE hSession,
CK_MECHANISM_PTR pMechanism, CK_ATTRIBUTE_PTR
pTemplate, CK_ULONG ulCount, CK_OBJECT_HANDLE_PTR
phKey)
```

The object handle can be used by the kernel in the future to reference the Master Key. The argument pTemplate is of importance here as it designates the object as a key with particular attributes. The attribute vector will establish the key as appropriate length, sensitivity, and use. Specifically, the key will be flagged as non-exportable (can't ever be exported encrypted) and sensitive (can't be exported in the clear).

Generating a Column Key

The Column Key will also be a symmetric key generated using the GenerateColumnKey function. The specific type of the key will be taken as an input to the function. The underlying code will execute almost identically as in the GenerateMasterKey function, but the attribute vector will differ.

In the two-tiered security system model, the Column Keys will be flagged as "non-sensitive". This means they will be exportable off the HSM as plaintext for use by the Database for encryption. Depending on the implementation of the HSM, the Column Keys may need to be generated simply as random data to be interpreted by the database as a key in order to exist in the clear outside of the HSM.

In the HSM-Only security system, the Column Keys will be flagged as "sensitive" and will not be exportable in the clear.

In both cases, the Column Key will be designated as being able to perform Encrypt and Decrypt (a data key) and of the desired type.

Key Identifier Enumeration

All keys within the HSM will have a key handle or identifier. The function EnumerateKeys will enumerate all key handle/identifiers to the caller. This function can be used to find a particular key handle that has been forgotten, to audit TDE usage, or to monitor key store space. The function will call:

```
C_FindObjectsInit(CK_SESSION_HANDLE hSession,
    CK_ATTRIBUTE_PTR pTemplate, CK_ULONG ulCount)
```

The template holds the attributes that are searched for. In this example, EnumerateKeys will perform several searches until all desired key types are found.

```
C_FindObjects(CK_SESSION_HANDLE hSession,
    CK_OBJECT_HANDLE_PTR phObject, CK_ULONG
    ulMaxObjectCount, CK_ULONG_PTR pulObjectCount)
``` actually performs the search and returns the objects.
C_FindObjectsFinal(CK_SESSION_HANDLE hSession)
terminates the search.

PKI Support

PKI Support is mainly intended as a key recovery/management tool. As the rest of this document makes clear, the bulk of encryption/decryption is done with symmetric keys. Even in the event that asymmetric keys are used for encryption/decryption, it is unlikely that the private keys will be distributed to individual users which eliminates much of the need for a conventional Certificate Authority (CA). In this case, the secure HSM will be the root of trust and can be viewed as a CA.

As the main concern is now key recovery, it is important to note that many HSM vendors will have out-of-band methods for backing up and recovering keys that may or may not use PKCS #11. The problem of key recovery and backup is left largely to the vendors. Below is a conventional way of recreating a key in the HSM by importing the plaintext key. This solution is less than ideal because customers will prefer that the plaintext key will never be exposed outside of the HSM boundaries.

The function DeriveKey can be used to import keys into the HSM using PKCS #11. The function will call the associate PKCS #11 function:

```
C_DeriveKey (CK_SESSION_HANDLE hSession,
CK_MECHANISM_PTR pMechanism, CK_OBJECT_HANDLE
hBaseKey, CK_ATTRIBUTE_PTR pTemplate, CK_ULONG ulCount,
CK_OBJECT_HANDLE_PTR phKey)
```

The significant information is contained in pTemplate, which is used to specify the key information. The specific mechanism to import a key will be handled by the function we create and not by the HSM. In fact, the HSM will always flag the key as a "non-local" key. The base key may have to be generated using a call to C_CreateObject.

Lastly, there is some mention in various sources of an in-bound way of importing PKCS #12 certificates to import private keys into a PKCS #11 token, but specifics are vague.

Key Removal

The function RemoveKey will remove a key based on an identifier if the proper authentication and authorization are present. Note that keys can be created in a way that will prevent them from being destroyed even in the event that the entire device is re-initialized. The main purpose of this function will be during the learning phase of a Security Officer. During this time, the SO may desire to create some test keys and then later destroy them to save space. This function will call:
C_DestroyObject(CK_SESSION_HANDLE hSession, CK_OBJECT_HANDLE hObject)

This function will destroy the specified object (which may or may not be a key). The implementation may perform various checks to make sure the object being destroyed is a key by verifying template using a C_FindObjects call.

Data Encryption/Decryption

In the two-tiered security system model, the kernel will feed the wrapped Column Key and the Master Key handle as inputs into the HSM. The HSM will then decrypt the wrapped Column Key with the specified Master Key and return the clear Column Key to the kernel. Then, the Column Key will be used as in today's Oracle Corporation's Server Held Key model to encrypt or decrypt data from the specified table.

In the HSM-only model, the kernel will feed the data directly into the HSM along with the wrapped Column Key, and the current Master Key handle. The HSM will unwrap (decrypt) the wrapped Column Key, and use the key to encrypt or decrypt the data. The plaintext or ciphertext will then be returned to the kernel. In this case, the HSM must support large amounts of data and this operation cannot be row by row for performance reasons. The HSM must be able to handle large groups of rows as input in order to streamline the process.

```
C_UnwrapKey(CK_SESSION_HANDLE hSession,
CK_MECHANISM_PTR pMechanism, CK_OBJECT_HANDLE
hUnwrappingKey, CK_BYTE_PTR pWrappedKey, CK_ULONG
ulWrappedKeyLen, CK_ATTRIBUTE_PTR pTemplate, CK_ULONG
ulAttributeCount, CK_OBJECT_HANDLE_PTR phKey)
```

The wrapped key will have been produced and returned to the Kernel by the Column Key generation function. The attribute template will set the Column Key as a Data Key.

The data can now be encrypted which will be executed by the following three function calls:

```
C_EncryptInit(CK_SESSION_HANDLE hSession,
CK_MECHANISM_PTR pMechanism, CK_OBJECT_HANDLE
hKey)
```

The object handle hKey must point to a key with CKA_ENCRYPT set to true (a data key). The pMechansim points to the encryption mechanism (algorithm). Then the call:

```
    C_Encrypt(CK_SESSION_HANDLE hSession,
    CK_BYTE_PTR pData, CK_ULONG ulDataLen,
    CK_BYTE_PTR pEncryptedData, CK_ULONG_PTR
    pulEncryptedDataLen)
``` actually encrypts the data. If there is enough data that another call is necessary, a call to:

```
    C_EncryptUpdate(CK_SESSION_HANDLE hSession,
    CK_BYTE_PTR pPart, CK_ULONG ulPartLen,
    CK_BYTE_PTR pEncryptedPart, CK_ULONG_PTR
    pulEncryptedPartLen)
```

This continues the encryption. Finally, once the encryption with a particular key is finished, a call to:

```
C_EncryptFinal(CK_SESSION_HANDLE hSession, CK_BYTE_PTR
pLastEncryptedPart, CK_ULONG_PTR pulLastEncryptedPartLen)
```

Finishes the multi-stage encryption. Decryption proceeds much in the same manner but with Decryption instead of Encryption. Again, following this call, the resulting encrypted or decrypted data is returned to the kernel.

In the two-tiered mode, the "unwrapping" of the column key is skipped. Instead, the wrapped (encrypted) column key is fed in as the "data", and the appropriate master key (flagged as a data key) is used to decrypt it. Then, the decrypted column key is fed back to the kernel. The kernel then uses the clear column key to perform encryption/decryption as needed using whatever mechanism is desired.

Keyed Hashing and Verification (Possible Requirement)

This function will create a signature (hash and then encrypt with a specified key). This function will be mainly used to preserve data integrity. Conventionally, keyed hashing (specifically HMAC) is used to preserve message integrity between two parties that have a shared secret. This is not to be confused with signatures which are used for both data integrity as well as non-repudiation (the sender cannot deny that they signed a message because the key used is only known by them). In our case, keyed hashing will not have a sender and receiver but rather the HSM will act as both the sender and receiver. The actual value of HMAC in this case is somewhat limited. Specifically, it may only be useful in that a brute force attacker will have one less test to verify when they have successfully cracked an encryption key.

Until the value of Keyed Hashing becomes clear, the specific implementation will not be discussed. However, PKCS #11 does support HMAC and HMAC verification.

Hashing

Standard Hashing (without a key) will be called by HashData can be done using a similar code path but using the following functions. This function will create a signature (hash and then encrypt with a specified key). This function will be mainly used to preserve data integrity. Most likely, the data will be a column key and the hash will be stored with the wrapped key for an integrity check. To initiate the hash of data, first we call:

```
        C_DigestInit(CK_SESSION_HANDLE hSession,
        CK_MECHANSIM_PTR pMechanism)
```

Then, we initiate the actual hashing:

```
C_Digest(CK_SESSION_HANDLE hSession, CK_BYTE_PTR pData,
CK_ULONG ulDataLen, CK_BYTE_PTR pDigest, CK_ULONG_PTR
pulDigestLen)
```

To continue the hash for large input data sets, we call:

```
        C_DigestUpdate(CK_SESSION_HANDLE hSession,
        CK_BYTE_PTR pPart, CK_ULONG ulPartLen)
```

Finally, we end the hash by calling:

```
        C_DigestFinal(CK_SESSION_HANDLE hSession,
        CK_BYTE_PTR pDigest, CK_ULONG_PTR pulDigestLen)
```

To verify this hash, the database will simply have the hash regenerated and compare the stored and re-generated versions.

Signing

This function will be used to sign data with an HSM private key. This may be useful in the future when multiple HSMs wish to share keys or communicate. Signatures will insure that data arrives uncorrupted and will prevent allow HSMs to verify the source of information. This call HSMSign will proceed as follows:

```
C_SignInit(CK_SESSION_HANDLE hSession,
CK_MECHANISM_PTR pMechanism, CK_OBJECT_HANDLE hKey)
```

This will initialize the signature with the specified key. To generate the signature, the function will call:

```
C_Sign(CK_SESSION_HANDLE hSession, CK_BYTE_PTR pData,
CK_ULONG ulDataLen, CK_BYTE_PTR pSignature,
CK_ULONG_PTR pulSignatureLen)
```

This function signs the data. Much like the encryption function, if the data is large and must be fed in piece by piece, the function KeyedHash will call:

```
C_SignUpdate(CK_SESSION_HANDLE hSession,
CK_BYTE_PTR pPart, CK_ULONG ulPartLen)
``` which continues the signature. Finally, a call to:

```
C_SignFinal(CK_SESSION_HANDLE hSession,
CK_BYTE_PTR pSignature, CK_ULONG_PTR pulSignatureLen)
``` finishes the signature.

Verification

To verify the signature will use the functions and have the name HSMVerify. It will call the following functions along the same lines as the hash generation. Again, we initiate the verification by calling:

```
C_VerifyInit(CK_SESSION_HANDLE hSession,
CK_MECHANISMPTR pMechanism, CK_OBJECT_HANDLE hKey)
```

We begin the actual verification by calling:

```
C_Verify(CK_SESSION_HANDLE hSession, CK_BYTE_PTR pData,
CK_ULONG ulDataLen, CK_BYTE_PTR pSignature, CK_ULONG
ulSignatureLen)
```

We continue the verification as long as necessary by repeatedly calling this function:

```
C_VerifyUpdate(CK_SESSION_HANDLE hSession, CK_BYTE_PTR
pPart, CK_ULONG ulPartLen)
```

Finally, we finish the verification by calling:

```
C_Verify_Final(CK_SESSION_HANDLE hSession, CK_BYTE_PTR
pSignature, CK_ULONG ulSignatureLen)
```

This returns CKR_OK if the hash verifies or CRK_SIGNATURE_INVALID if the signature is invalid.

Session Termination

To terminate a session the function EndHSMSession will be used. This function should be called whenever the HSM is not being used by the database to prevent an attacker from accessing the HSM through an open session. This function will call:

C_Finalize(CK_VOID_PTR preserved)

"To indicate that the application is finished with the Cryptoki library" (RSA Security Inc. PKCS #11: Cryptographic Token Interface Standard. An RSA Laboratories Technical Note, Version 2.20, June 2004). Then:

C_CloseSession(CK_SESSION_HANDLE hSession)

is called to close the session. At this point, the Kernel cannot access private objects in the HSM.

Create HSM Client Account

To setup the Token, the SO must first connect to the database and call InitializeHSM. As explained above, this function establishes the root of trust with the first person to contact the HSM. The function will initiate a session with the Token and then call:

```
C_InitToken(UK_SLOT_ID slotID, CK_UTF8CHAR_PTR pPin,
CK_ULONG ulPinLen, CK_UTF8CHAR_PTR pLabel)
``` to initialize the SO PIN. After this, the function can call
C_InitPIN(CK_SESSION_HANDLE hSession, CK_UTF8CHAR_PTR pPin)

to initialize the "normal user" PIN. This "normal user" PIN will be used by the kernel to authenticate to the device. Once an initial "normal user" PIN has been established, it will be stored in the wallet or returned to the caller depending on the mode.

Delete or Reset HSM Client Account

It must be possible to delete or revoke an existing client account in the event that a client has become compromised. To delete or revoke an existing client account, call InitializeHSM and return the PIN to the calling user. This will deny the Kernel access to the HSM. InitializeHSM will destroy all keys on the HSM that are labeled as destroyable. Note that the MasterKey will be labeled as not destroyable.

To change the password call ResetNormalUserPass which in turn will login as the normal user and call:

```
C_SetPin(CK_SeSSION_HANDLE hSession, CK_UTF8CHAR_PTR
pOldPin, CK_ULONG ulOldLen, CK_UTF8Char_PTR pNewPin,
CK_ULONG ulNewLen)
```

The new PIN will be placed into the wallet. This should be used on a fairly regular basis to prevent a brute-force attack on the HSM.

Key Recovery and Replication

Recovery of the Master Key is HSM dependent and not implemented by Oracle, although Oracle will support various HSM key recovery systems.

Because Column Keys exist in insecure memory encrypted by the Master Key, they can be backed up on insecure memory. The wrapped keys are of no value in themselves, so key recovery will simply involve rewriting the Column Key meta-data table from a backup. Then encryption/decryption operations proceed as before assuming the Master Key has not been lost.

If the HSM is not a shared device, the HSM shall provide customers with a secure means of replicating the content of one HSM in another HSM. Some customers may deploy standby databases that can provide full access to data should the primary database fail. If the standby databases have their own HSMs, the HSM must contain the same set of keys as the HSM for the primary database. Replication of data across multiple HSMs is left to the HSM manufacturer.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using an external security module to secure data in a database without having to modify database applications, the method comprising:
   generating a column key in the database;
   passing the column key to the external security module;
   receiving a wrapped column key corresponding to the column key from the external security module, wherein the wrapped column key is obtained by encrypting the column key using a master key;
   storing the wrapped column key in the database;
   receiving a request at the database to perform an encryption/decryption operation;
   in response to the request, passing the wrapped column key to the external security module, thereby allowing the external security module to decrypt the wrapped column key using the master key to obtain the column key;
   receiving the column key from the external security module;
   performing the encryption/decryption operation on data in the database using the received column key; and
   erasing the column key from memory in the database.

2. The method of claim 1, further comprising generating the master key by:
   sending a request to the external security module to create a random key with a data key type to be used as the master key;
   flagging the master key as non-exportable; and
   receiving a handle from the external security module at the database that facilitates referencing the master key during subsequent database transactions.

3. The method of claim 1, further comprising:
   generating a random number in the database for use as the column key;
   flagging the wrapped column key as exportable; and
   storing the wrapped column key in a column key metadata table.

4. The method of claim 1, wherein the external security module can be a hardware security module or a software security module.

5. The method of claim 1, further comprising storing data in the external security module.

6. The method of claim 1, wherein the external security module is authenticated to the database via at least one of:
   a direct attachment to the database;
   a username and a password; and
   a strong authentication method, including a security token or a smart card.

7. The method of claim 1, wherein the encryption can be either symmetric encryption or asymmetric encryption.

8. The method of claim 1, wherein the master key only exists in the external security module.

9. A method for using an external security module to secure data in a database without having to modify database applications, the method comprising:
   generating a column key in the database;
   passing the column key to the external security module;
   receiving a wrapped column key corresponding to the column key from the external security module, wherein the wrapped column key is obtained by encrypting the column key using a master key;
   storing the wrapped column key in the database;
   receiving a request at the database to perform an encryption/decryption operation;
   in response to the request, passing the wrapped column key and data to the external security module, thereby allowing the external security module to decrypt the wrapped column key using the master key to obtain the column key and to encrypt/decrypt the data using the column key;
   receiving the encrypted/decrypted data at the database from the external security module.

10. The method of claim 9, further comprising generating the master key by:
    sending a request to the external security module to create a random key with a wrapper key type to be used as the master key;
    flagging the master key as non-exportable; and
    receiving a handle from the external security module at the database that facilitates referencing the master key during subsequent database transactions.

11. The method of claim 9, further comprising:
    generating a random number for use as the column key;
    flagging the wrapped column key as exportable and sensitive, wherein the wrapped column key is only exportable in an encrypted state;
    and
    storing the wrapped column key in a column key metadata table.

12. The method of claim 9, wherein the external security module can be a hardware security module or a software security module.

13. The method of claim 9, further comprising storing data in the external security module.

14. The method of claim 9, wherein the external security module is authenticated to the database via at least one of:
    a direct attachment to the database;
    a username and a password; and
    a strong authentication method, including a security token or a smart card.

15. The method of claim 9, wherein the encryption can be either symmetric encryption or asymmetric encryption.

16. A computer-readable storage medium storing instructions that when executed by a computer cause the computer to perform a method for using an external security module to secure data in a database without having to modify database applications, the method comprising:
    generating a column key in the database;
    passing the column key to the external security module;
    receiving a first wrapped column key corresponding to the column key from the external security module, wherein the wrapped column key is obtained by encrypting the column key using a master key;
    storing the wrapped column key in the database;
    receiving a request at the database to perform an encryption/decryption operation;
    in response to the request, passing the wrapped column key to the external security module, thereby allowing the external security module to decrypt the wrapped column key using the master key to obtain the column key receiving the column key from the external security module to the database;

performing the encryption/decryption operation on data in the database using the received column key; and erasing the column key from memory in the database.

17. The computer-readable storage medium of claim 16, wherein the method further comprises generating the master key by:

sending a request to the external security module to create a random key with a data key type to be used as the master key;

flagging the master key as non-exportable; and receiving a handle from the external security module at the database that facilitates referencing the master key during subsequent database transactions.

18. The computer-readable storage medium of claim 16, wherein the method further comprises:

generating a random number in the database for use as the column key;

flagging the wrapped column key as exportable; and storing the wrapped column key in a column key metadata table.

19. The computer-readable storage medium of claim 16, wherein the external security module can be a hardware security module or a software security module.

20. The computer-readable storage medium of claim 16, wherein the method further comprises storing data in the external security module.

21. The computer-readable storage medium of claim 16, wherein the external security module is authenticated to the database via at least one of:

a direct attachment to the database;

a username and a password; and a strong authentication method, including a security token or a smart card.

22. The computer-readable storage medium of claim 16, wherein the encryption can be either symmetric encryption or asymmetric encryption.

23. The computer-readable storage medium of claim 16, wherein the master key only exists in the external security module.

24. A computer-readable storage medium storing instructions that when executed by a computer cause the computer to perform a method for using an external security module to secure data in a database without having to modify database applications, the method comprising:

generating a column key in the database;

passing the column key to the external security module;

receiving a wrapped column key corresponding to the column key from the external security module, wherein the wrapped column key is obtained by encrypting the first column key using a master key;

storing the wrapped column key in the database;

receiving a request at the database to perform an encryption/decryption operation;

in response to the request, passing the wrapped column key and data to the external security module, thereby allowing the external security module to decrypt the wrapped column key using the master key to obtain the column key and to encrypt/decrypt the data using the column key and receiving the encrypted/decrypted data at the database from the external security module.

25. The computer-readable storage medium of claim 24, wherein the method further comprises generating the master key by:

sending a request to the external security module to create a random key with a wrapper key type to be used as the master key;

flagging the master key as non-exportable; and receiving a handle from the external security module at the database that facilitates referencing the master key during subsequent database transactions.

26. The computer-readable storage medium of claim 24, wherein the method further comprises:

generating a random number for use as the column key;

flagging the wrapped column key as exportable and sensitive, wherein the wrapped column key is only exportable in an encrypted state; and storing the wrapped column key in a column key metadata table.

27. The computer-readable storage medium of claim 24, wherein the external security module can be a hardware security module or a software security module.

28. The computer-readable storage medium of claim 24, wherein the method further comprises storing data in the external security module.

29. The computer-readable storage medium of claim 24, wherein the external security module is authenticated to the database via at least one of:

a direct attachment to the database;

a username and a password; and a strong authentication method, including a security token or a smart card.

30. The computer-readable storage medium of claim 24, wherein the encryption can be either symmetric encryption or asymmetric encryption.

* * * * *

UNITED STATES PATENT AND TRADEMARK OFFICE
CERTIFICATE OF CORRECTION

| | | |
|---|---|---|
| PATENT NO. | : 7,639,819 B2 | Page 1 of 1 |
| APPLICATION NO. | : 11/156307 | |
| DATED | : December 29, 2009 | |
| INVENTOR(S) | : Min-Hank Ho et al. | |

It is certified that error appears in the above-identified patent and that said Letters Patent is hereby corrected as shown below:

In column 9, line 24, delete "pMechansim" and insert -- pMechanism --, therefor.

In column 10, line 26, delete "MECHANSIM" and insert -- MECHANISM --, therefor.

In column 11, line 37, delete "CK_MECHANISMPTR" and insert -- CK_MECHANISM_PTR --, therefor.

In column 12, line 22, delete "(UK" and insert -- (CK --, therefor.

In column 12, line 47, delete "SeSSION" and insert -- SESSION --, therefor.

In column 14, line 18, in claim 9, after "key;" insert -- and --.

In column 15, line 2, in claim 16, after "key" insert -- ; --.

In column 16, line 12, in claim 24, after "key" insert -- ; --.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,639,819 B2
APPLICATION NO. : 11/156307
DATED : December 29, 2009
INVENTOR(S) : Ho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this

Ninth Day of November, 2010

David J. Kappos
*Director of the United States Patent and Trademark Office*